United States Patent
Matsuo et al.

(10) Patent No.: US 10,970,326 B2
(45) Date of Patent: Apr. 6, 2021

(54) RETRIEVING DEVICE, RETRIEVING METHOD, AND RETRIEVING PROGRAM

(71) Applicant: FANUC CORPORATION, Yamanashi (JP)

(72) Inventors: Kenichi Matsuo, Yamanashi (JP); Masao Kamiguchi, Yamanashi (JP); Masato Yamamura, Yamanashi (JP); Shouichi Kawakami, Yamanashi (JP); Yutaka Igarashi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 1 day.

(21) Appl. No.: 15/810,349

(22) Filed: Nov. 13, 2017

(65) Prior Publication Data

US 2018/0137129 A1 May 17, 2018

(30) Foreign Application Priority Data

Nov. 16, 2016 (JP) ............... JP2016-223306
May 22, 2017 (JP) ............... JP2017-101040
Aug. 23, 2017 (JP) ............... JP2017-159990

(51) Int. Cl.
*G06F 16/00* (2019.01)
*G06F 16/35* (2019.01)
*G06F 16/93* (2019.01)

(52) U.S. Cl.
CPC ............ *G06F 16/355* (2019.01); *G06F 16/93* (2019.01)

(58) Field of Classification Search
CPC ............... G06F 16/355; G06F 16/93
See application file for complete search history.

(56) References Cited

U.S. PATENT DOCUMENTS 8,301,481 B2    10/2012  Boraas et al.
2007/0061186 A1* 3/2007  Boraas ............ G06Q 10/06395
                                                705/7.41

(Continued)

FOREIGN PATENT DOCUMENTS

CN    101482878    7/2009
JP    5-314182     11/1993

(Continued)

OTHER PUBLICATIONS

Office Action dated Aug. 5, 2019 in CN Patent Application No. 201711117115.9.

(Continued)

*Primary Examiner* — Tamara T Kyle
*Assistant Examiner* — Lahcen Ennaji
(74) *Attorney, Agent, or Firm* — Wenderoth, Lind & Ponack, L.L.P.

(57) ABSTRACT

A retrieving device includes: a classifying unit that classifies document data made up of a plurality of items on the basis of a degree of matching of a first item in which a combination of one or more symbol strings is described in a database in which the document data is stored; and an extracting unit that extracts a group of keywords included in a second item from pieces of document data in a same group classified by the classifying unit as related words for retrieval. Moreover, when the retrieving device is implemented as a distributed system on a network, it is possible to create related words for a plurality of machines and to store the related word data and to enable a plurality of users to use the distributed system.

14 Claims, 11 Drawing Sheets

| NUMBER | PHENOMENON | KEYWORD A(n) | CAUSE B(n) | COUNTERMEASURE C(n) | PART D(n) | AGGREGATE S(n) |
|---|---|---|---|---|---|---|
| 12 | MACHINE WAS STOPPED BECAUSE ABNORMAL SOUND WAS GENERATED FROM TABLE XV DURING OPERATION. | ABNORMAL SOUND IS GENERATED | WEARING OF MECHANISM XV | REPLACE PART OF XV | X0015(1)+V002(1) | 1 |
| 145 | VIBRATION WAS GENERATED FROM MECHANISM XV DURING MACHINING AND MACHINING DEFECTS OCCURRED. | VIBRATION IS GENERATED | DAMAGE TO MECHANISM XV | EXAMINE PART OF XV | X0015(1)+V002(1) | 1 |
| 332 | NOISE WAS GENERATED ABRUPTLY DURING CUTTING AND MACHINE WAS STOPPED. NEAR XV AXIS. | NOISE IS GENERATED | WEARING OF MECHANISM XV | EXAMINE PART OF XV | X0015(1)+V002(1) | 1 |
| ⋮ | ⋮ | ⋮ | ⋮ | ⋮ | ⋮ | ⋮ |
| 23 | XZ UNIT WON'T MOVE MANUALLY. | DO NOT MOVE | DESTRUCTION OF MECHANISM XZ | REPLACE PARTS OF XZ | AZX(1)+Z055(1) | 1 |
| 775 | XZ UNIT DID NOT OPERATE DURING OPERATION. | DO NOT OPERATE | DAMAGE TO MECHANISM XZ | REPLACE PARTS OF XZ | AZX(1)+Z055(1) | 1 |
| 980 | XZ UNIT STOPPED ABRUPTLY DURING OPERATION. | STOPPED | MECHANISM XZ LOCKED | REPLACE PARTS OF XZ | AZX(1)+Z055(1) | 1 |
| ⋮ | ⋮ | ⋮ | ⋮ | ⋮ | ⋮ | ⋮ |

(56) References Cited

U.S. PATENT DOCUMENTS

| | | | | |
|---|---|---|---|---|
| 2007/0124265 | A1* | 5/2007 | Hebbani | G06N 5/04 |
| | | | | 706/45 |
| 2009/0076839 | A1* | 3/2009 | Abraham-Fuchs | |
| | | | | G06F 16/3344 |
| | | | | 705/2 |
| 2009/0182733 | A1* | 7/2009 | Itoh | G06F 16/93 |
| 2009/0313236 | A1* | 12/2009 | Hernacki | G06F 16/951 |
| 2013/0080469 | A1* | 3/2013 | Choi | G06F 3/0485 |
| 2014/0195184 | A1* | 7/2014 | Maeda | G01D 18/006 |
| | | | | 702/85 |
| 2015/0006563 | A1* | 1/2015 | Carattini | G06F 16/24534 |
| | | | | 707/765 |
| 2017/0004224 | A1* | 1/2017 | Bergs | G06F 16/332 |
| 2017/0132638 | A1* | 5/2017 | Chigusa | G06N 5/02 |
| 2017/0280009 | A1* | 9/2017 | Burke, Jr. | G06F 3/121 |

FOREIGN PATENT DOCUMENTS

| | | |
|---|---|---|
| JP | 2002-049676 | 2/2002 |
| JP | 2003-316817 | 11/2003 |

OTHER PUBLICATIONS

Notice of Reasons for Refusal dated Aug. 14, 2018 in corresponding Japanese Application No. 2017-159990.

Salton, Gerard, "Automatic Text Processing: The Transformation, Analysis, and Retrieval of Information by Computer," Addison-Wesley, 1989, Ch. 8: Conventional Text-Retrieval Systems and Ch. 9: Automatic Indexing, Seiten, pp. 229-312, ISBN 0-201-12227-8.

Office Action dated Aug. 6, 2020 in corresponding DE Patent Application No. 102017220140.1.

* cited by examiner

FIG. 2

| NUMBER | PHENOMENON | KEYWORD A(n) | CAUSE B(n) | COUNTERMEASURE C(n) | PART D(n) | AGGREGATE S(n) |
|---|---|---|---|---|---|---|
| 12 | MACHINE WAS STOPPED BECAUSE ABNORMAL SOUND WAS GENERATED FROM TABLE XV DURING OPERATION. | ABNORMAL SOUND IS GENERATED | WEARING OF MECHANISM XV | REPLACE PART OF XV | X0015(1)+V002(1) | 1 |
| 145 | VIBRATION WAS GENERATED FROM MECHANISM XV DURING MACHINING AND MACHINING DEFECTS OCCURRED. | VIBRATION IS GENERATED | DAMAGE TO MECHANISM XV | EXAMINE PART OF XV | X0015(1)+V002(1) | 1 |
| 332 | NOISE WAS GENERATED ABRUPTLY DURING CUTTING AND MACHINE WAS STOPPED. NEAR XV AXIS. | NOISE IS GENERATED | WEARING OF MECHANISM XV | EXAMINE PART OF XV | X0015(1)+V002(1) | 1 |
| ... | ... | ... | ... | ... | ... | ... |
| 23 | XZ UNIT WON'T MOVE MANUALLY. | DO NOT MOVE | DESTRUCTION OF MECHANISM XZ | REPLACE PARTS OF XZ | AZX(1)+Z055(1) | 1 |
| 775 | XZ UNIT DID NOT OPERATE DURING OPERATION. | DO NOT OPERATE | DAMAGE TO MECHANISM XZ | REPLACE PARTS OF XZ | AZX(1)+Z055(1) | 1 |
| 980 | XZ UNIT STOPPED ABRUPTLY DURING OPERATION. | STOPPED | MECHANISM XZ LOCKED | REPLACE PARTS OF XZ | AZX(1)+Z055(1) | 1 |
| ... | ... | | | | ... | ... |

FIG. 9A
PLEASE INPUT MACHINE ID TO BE DIAGNONOSED.
FIG. 9B
PLEASE INPUT INQUIRY CONTENT.
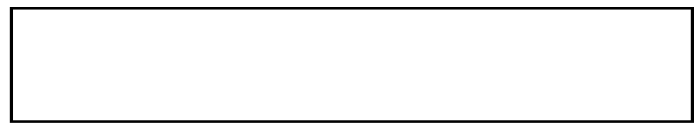
FIG. 9C
RESPONSE
AN ALARM OF A COOLING FAN OF A CONTROL APPARATUS IS OUTPUT.
PLEASE REPLACE THE COOLING FAN ACCORDING TO GUIDANCE.

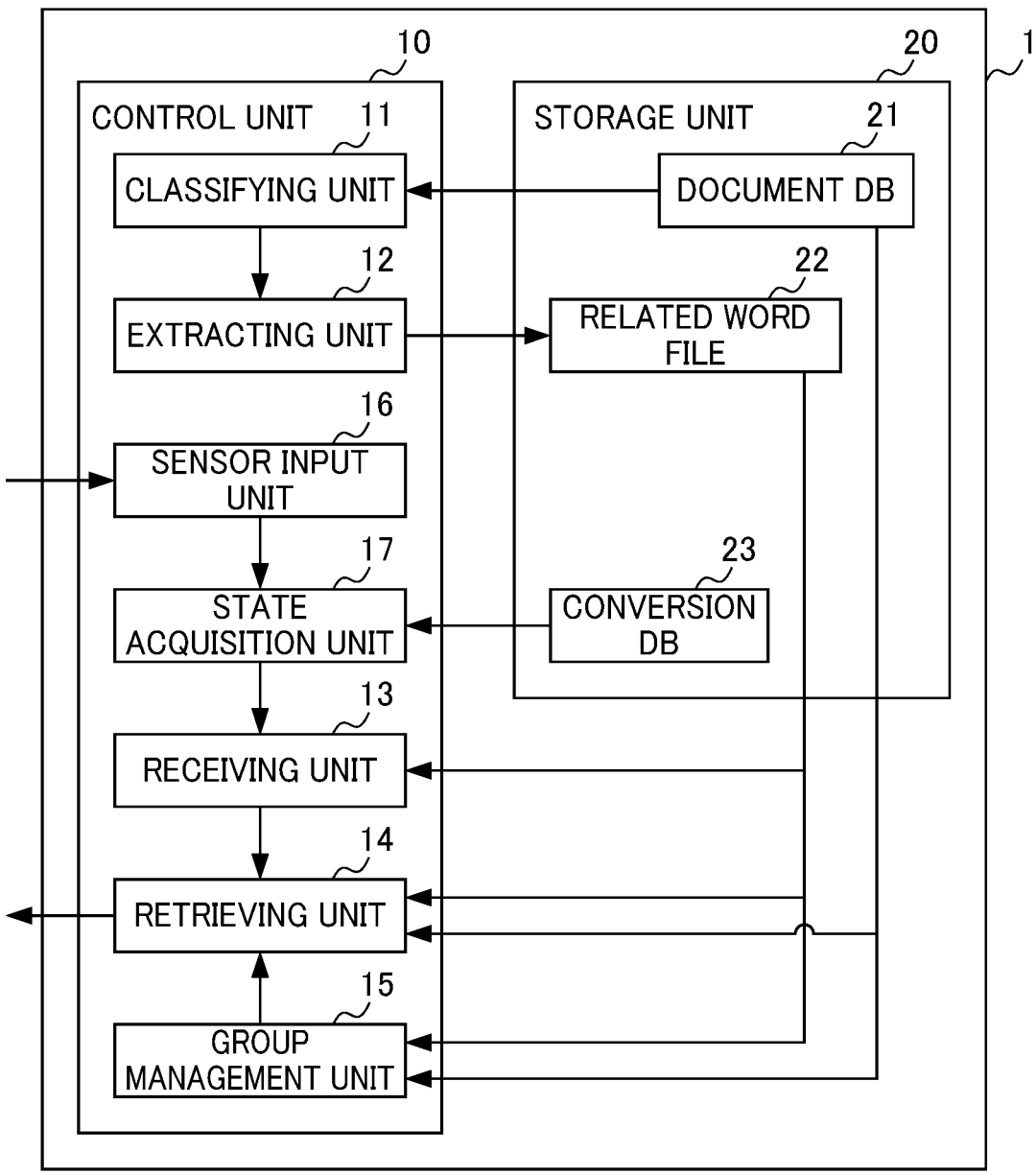

FIG. 11

| MEASUREMENT VALUE | NUMBER OF TIMES THRESHOLD IS EXCEEDED | INTEGRAL VALUE | STATE |
|---|---|---|---|
| PRESENT TEMPERATURE >THRESHOLD | 5 OR MORE | ACTUAL INTEGRAL VALUE ≧SETTING VALUE | OVERHEAT |
| PRESENT TEMPERATURE >THRESHOLD | 5 OR MORE | ACTUAL INTEGRAL VALUE <SETTING VALUE | LOAD ABNORMALITY |
| PRESENT PRESSURE >THRESHOLD | 1 OR MORE | ACTUAL INTEGRAL VALUE ≧SETTING VALUE | PRESSURE ABNORMALITY |
| ... | ... | ... | ... |

FIG. 12

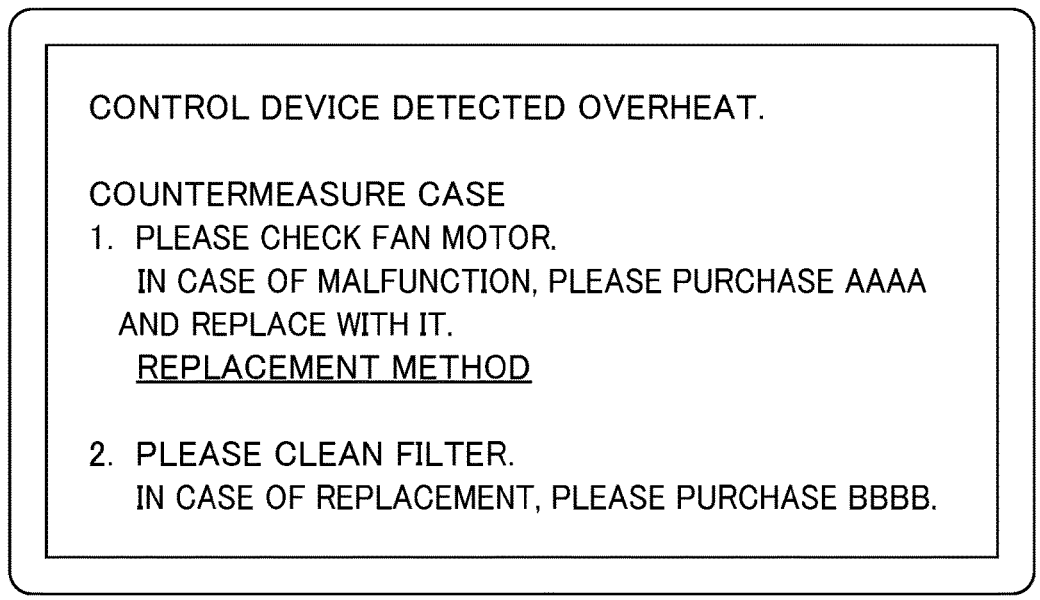

CONTROL DEVICE DETECTED OVERHEAT.

COUNTERMEASURE CASE
1. PLEASE CHECK FAN MOTOR.
   IN CASE OF MALFUNCTION, PLEASE PURCHASE AAAA AND REPLACE WITH IT.
   REPLACEMENT METHOD

2. PLEASE CLEAN FILTER.
   IN CASE OF REPLACEMENT, PLEASE PURCHASE BBBB.

RETRIEVING DEVICE, RETRIEVING METHOD, AND RETRIEVING PROGRAM

This application is based on and claims the benefit of priority from Japanese Patent Application Nos. 2016-223306, 2017-101040 and 2017-159990, respectively filed on 16 Nov. 2016, 22 May 2017 and 23 Aug. 2017, the contents of which are incorporated herein by reference.

BACKGROUND OF THE INVENTION

Field of the Invention

The present invention relates to a retrieving device, a retrieving method, and a retrieving program for retrieving documents using keywords.

Related Art

Conventionally, in order to solve failures presently occurring in machine tools and the like in a manufacturing site, information is often acquired from a past failure report stored in advance by keyword-based retrieval. For example, Patent Document 1 discloses a method of displaying candidates for refined keywords in descending order of cumulative numbers of keywords present in a group of documents as a guidance in order to guide refining of retrieval in a desirable direction as a keyword-based retrieval method (for example, see Patent Document 1).

Patent Document 1: Japanese Unexamined Patent Application, Publication No. H05-314182

SUMMARY OF THE INVENTION

However, when users input a present phenomenon, since the same phenomenon is expressed in different words depending on a user, it may be difficult to retrieve past documents appropriately. For example, when such a failure that a machine generates sound occurs, users may express this phenomenon in different keywords such as "abnormal sound is generated", "vibration is generated", or "noise is generated".

In the conventional technique, these keywords are treated independently without taking relevance of the keywords into consideration. Therefore, in order to retrieve a wide range of related documents, the number of retrievals increases or it is necessary to perform complex retrieval using a logical operation expression such as "abnormal sound is generated" OR "vibration is generated" OR "noise is generated". Moreover, when a user cannot think of these related keywords, it is not possible to obtain desired retrieval results.

An object of the present invention is to provide a retrieving device, a retrieving method, and a retrieving program capable of improving document retrieval efficiency.

(1) A retrieving device (for example, a "retrieving device 1" to be described later) according to the present invention includes: a classifying unit (for example, a "classifying unit 11" to be described later) that classifies document data made up of a plurality of items on the basis of a degree of matching of a first item in which a combination of one or more symbol strings is described in a database (for example, a "document database 21" to be described later) in which the document data is stored; an extracting unit (for example, an "extracting unit 12" to be described later) that extracts a group of keywords included in a second item from pieces of document data in a same group classified by the classifying unit as related words for retrieval.

(2) In the retrieving device according to (1), the classifying unit may classify pieces of document data of which the first items match perfectly into a same group.

(3) In the retrieving device according to (2), the classifying unit may classify pieces of document data of which at least some of the first items match into a same group.

(4) The retrieving device according to any one of (1) to (3) may further include: a receiving unit (for example, a "receiving unit 13" to be described later) that receives a retrieval request based on a first keyword; and a retrieving unit (for example, a "retrieving unit 14" to be described later) that retrieves the document data using the first keyword and retrieves the document data using a second keyword included in the same group of keywords as the first keyword.

(5) In the retrieving device according to (4), the receiving unit may display a group of keywords including the first keyword and receive input of the second keyword.

(6) In the retrieving device according to (4), the retrieving unit may sequentially extract the second keywords from a group of keywords including the first keywords and retrieve the document data using the respective second keywords.

(7) The retrieving device according to any one of (4) to (6) may further include: a group management unit (for example, a "group management unit 15" to be described later) that manages at least two or more different databases as one set of database groups and manages a group of keywords extracted as related words for retrieval by the extracting unit as one set of keyword groups for each of the databases included in the one set of database groups, wherein the retrieving unit may retrieve document data stored in the database included in the one set of database groups with respect to the retrieval request based on the first keyword and retrieve the document data using the second keyword included in the same group of keywords as the first keyword in the one set of keyword groups.

(8) In the retrieving device according to any one of (4) to (7), the receiving unit may receive one or a plurality of sentences as the retrieval request and then extract the first keyword from the one or the plurality of sentences by the same procedure as a procedure of the extracting unit (12) extracting the group of keywords.

(9) The retrieving device according to any one of (4) to (7) may further include: a sensor input unit (for example, a "sensor input unit 16" to be described later) that inputs sensor information of an apparatus; and a state acquisition unit (for example, a "state acquisition unit 17" to be described later) that converts the sensor information to a state keyword indicating the apparatus state on the basis of a predetermined conversion condition, wherein the receiving unit may receive the state keyword as the first keyword.

(10) In the retrieving device according to any one of (1) to (9), the document data may be a failure report of an apparatus, and the symbol string may be a specification number and the number of repair target parts.

(11) A retrieving method according to the present invention causes a computer to execute: a classifying step of classifying document data made up of a plurality of items on the basis of a degree of matching of a first item in which a combination of one or more symbol strings is described in a database in which the document data is stored; an extracting step of extracting a group of keywords included in a second item from pieces of document data in a same group classified by the classifying step as related words for retrieval.

(12) The retrieving method according to (11) may further cause the computer to execute: a receiving step of receiving a retrieval request based on a first keyword; and a retrieving step of retrieving the document data using the first keyword and retrieves the document data using a second keyword included in the same group of keywords as the first keyword.

(13) The retrieving method according to (12) may further cause the computer to execute: a group management step of managing at least two or more different databases as one set of database groups and managing a group of keywords extracted as related words for retrieval in the extracting step as one set of keyword groups for each of the databases included in the one set of database groups, wherein the retrieving step involves retrieving document data stored in the database included in the one set of database groups with respect to the retrieval request based on the first keyword and retrieving the document data using the second keyword included in the same group of keywords as the first keyword in the one set of keyword groups.

(14) In the retrieving method according to (12) or (13), the receiving step may involve receiving one or a plurality of sentences as the retrieval request and then extracts the first keyword from the one or the plurality of sentences by the same procedure as a procedure of extracting the group of keywords in the extracting step.

(15) The retrieving method according to (12) or (13) may further cause the computer to execute: a sensor input step of inputting sensor information of an apparatus; and a state acquisition step of converting the sensor information to a state keyword indicating the apparatus state on the basis of a predetermined conversion condition, wherein the receiving step involves receiving the state keyword as the first keyword.

(16) A retrieving program according to the present invention causes a computer to function as the retrieving device according to any one of (1) to (10).

According to the present invention, it is possible to improve document retrieval efficiency.

BRIEF DESCRIPTION OF THE DRAWINGS

FIG. 2 is a diagram illustrating document data stored in a document database according to the first embodiment.

FIG. 9A is a first diagram illustrating a display example of a retrieval screen according to the second embodiment.

FIG. 9B is a second diagram illustrating a display example of a retrieval screen according to the second embodiment.

FIG. 9C is a third embodiment illustrating a display example of a retrieval screen according to the second embodiment.

FIG. 10 is a block diagram illustrating a functional configuration of a retrieving device according to a fourth embodiment.

FIG. 11 is a diagram illustrating a conversion database according to the fourth embodiment.

FIG. 12 is a diagram illustrating a display example of a retrieval result according to the fourth embodiment.

DETAILED DESCRIPTION OF THE INVENTION

First Embodiment

Hereinafter, a first embodiment of the present invention will be described. A retrieving device 1 of the first embodiment retrieves document data stored in a database on the basis of a keyword input from a user. The retrieval target document data is a failure report of an apparatus stored as a past case and includes respective pieces of data of phenomena, causes, countermeasures, and parts, for example. The user obtains information on causes, countermeasures, and parts by retrieving similar phenomena occurred in the past.

Figure 1:
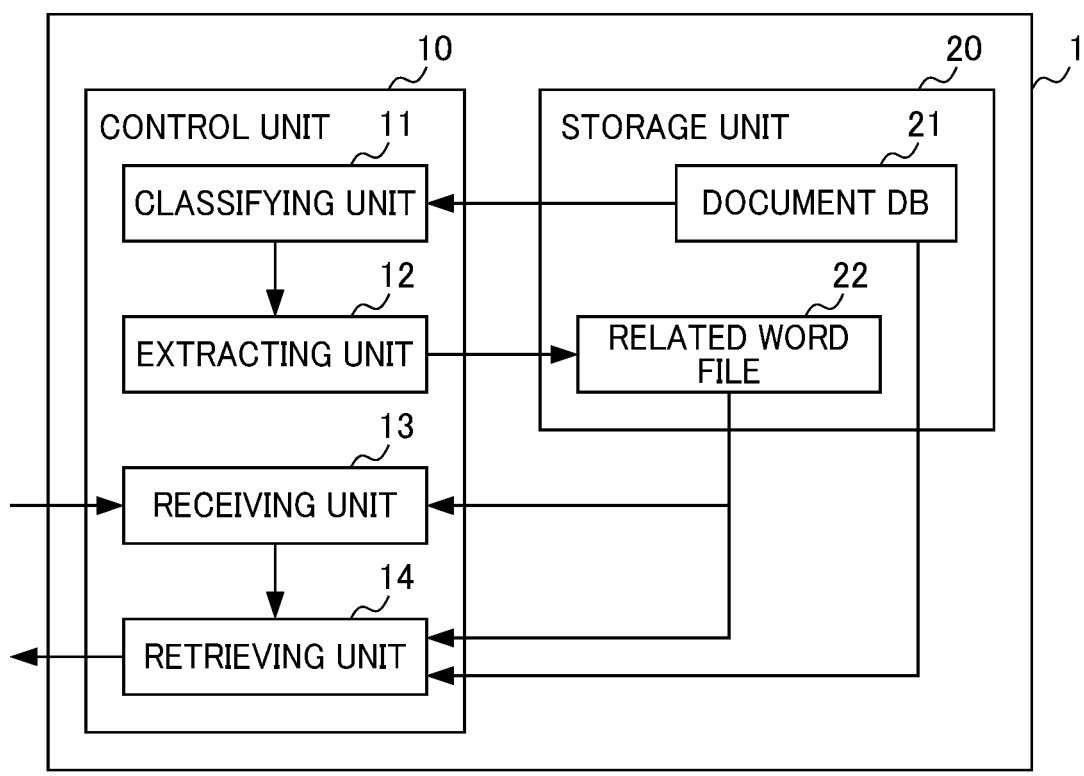
FIG. 1 is a block diagram illustrating a functional configuration of a retrieving device according to a first embodiment.

FIG. 1 is a block diagram illustrating a functional configuration of the retrieving device 1 according to the first embodiment. The retrieving device 1 is an information processing device (a computer) such as a server device or a PC, and includes a control unit 10 and a storage unit 20. Furthermore, the retrieving device 1 includes various data input/output devices, a communication device, and the like, and searches a document database on the basis of a search keyword input from a user and outputs a retrieval result.

The control unit 10 is a unit that controls the entire retrieving device 1 and realizes various functions of the first embodiment by reading and executing various programs stored in the storage unit 20 appropriately. The control unit 10 may be a CPU.

The storage unit 20 may be a storage area of various programs for causing a group of hardware to function as the retrieving device 1 and various pieces of data and may be a ROM, a RAM, a flash memory, or a hard disk drive (HDD). Specifically, the storage unit 20 stores a document database (DB) 21 in which retrieval target document data is stored and a related word file 22 in which a group of keywords classified as synonyms are described in correlation as well as a retrieving program for causing the control unit 10 to execute respective functions of the first embodiment. These pieces of data may be stored outside the retrieving device 1 and may be read and written by communication with the retrieving device 1.

The control unit 10 includes a classifying unit 11, an extracting unit 12, a receiving unit 13, and a retrieving unit 14, and retrieves document data using related words of an input keyword with the aid of these functional units.

The classifying unit 11 classifies document data on the basis of a degree of matching of a first item (for example, a part) in which a combination of one or more symbol strings is described in the document database 21 in which document data made up of a plurality of items (for example, a phenomenon, a cause, a countermeasure, a part, and the like) are stored and provides a classification result to the extracting unit 12. Moreover, the classification result may be stored in the document database 21. Here, the symbol string is a specification number and the number of repair target or candidate parts. The classifying unit 11 may classify document data of which the first items match perfectly into the same group and may classify document data of which at least portions of the first items (for example, predetermined major parts and the like) match into the same group.

The extracting unit 12 extracts a group of keywords included in a second item (phenomenon) from the document data in the same group classified by the classifying unit 11 as related words to create the related word file 22.

The receiving unit 13 receives a document data retrieval request based on the first keyword. Furthermore, the receiving unit 13 receives a second keyword selected from a group of keywords by extracting a group of keywords of related words including the first keyword from the related word file 22 and displaying the group of keywords.

The retrieving unit 14 retrieves document data of the document database 21 using the first keyword and retrieves document data using the second keyword included in the group of keywords of the related words classified into the same group as the first keyword in the related word file 22. In this case, the retrieving unit 14 may perform retrieval using the second keyword after waiting for the second keyword received by the receiving unit 13. Alternatively, the retrieving unit 14 may sequentially extract the second keywords from the group of keywords including the first keyword and may retrieve document data automatically from the respective extracted second keywords.

FIG. 2 is a diagram illustrating document data stored in the document database 21 according to the first embodiment. The document data as a failure report includes respective items of a phenomenon, and a search keyword $A(n)$ extracted from the phenomenon, a cause $B(n)$, a countermeasure $C(n)$, a part $D(n)$, and a aggregation $S(n)$ with respect to a management number for identifying the document data. The retrieving device 1 retrieves the document data by matching the input keyword to the search keyword $A(n)$ extracted from the phenomenon.

In the part item (the first item) $D(n)$, information on the number of pieces is added to each part, and for example, a number is described in parenthesis like "X0015(1)". In this case, whether parts can be classified into the same group is determined on the basis of the degree of matching of parts including the number of pieces. The format of a description of parts is not limited to this and an item may be subdivided for respective parts.

Since the part items (the first items) $D(n)$ of the document data indicated by management numbers 12, 145, and 332 have the same value "X0015(1)+V002(1)", these part items are classified into the same group, and the keywords $A(n)$ (for example, "abnormal sound is generated", "vibration is generated", and "noise is generated") described in the phenomenon (the second items) are extracted as related words. Moreover, since the part items (the first items) $D(n)$ of the document data indicated by management numbers 23, 775, and 980 have the same value "AZX(1)+Z055(1)", these part items are classified into the same group, and the keywords $A(n)$ (for example, "do not move", "do not operate", and "stopped") described in the phenomenon (the second items) are extracted as related words.

In this example, parts of which the first items match perfectly are classified into the same group. However, classification method based on the degree of matching is not limited to this. The document data may be classified on the basis of partial matching including the same part (specifications or specifications and the number of pieces), and may be classified on the basis of an inclusion relation that one is completely included in the other. The definition of the degree of matching for parts to be classified as the same group may be set appropriately. The aggregation $S(n)$ is flag data indicating whether related word data processing to be described later (FIG. 4) is completed.

Figure 3:
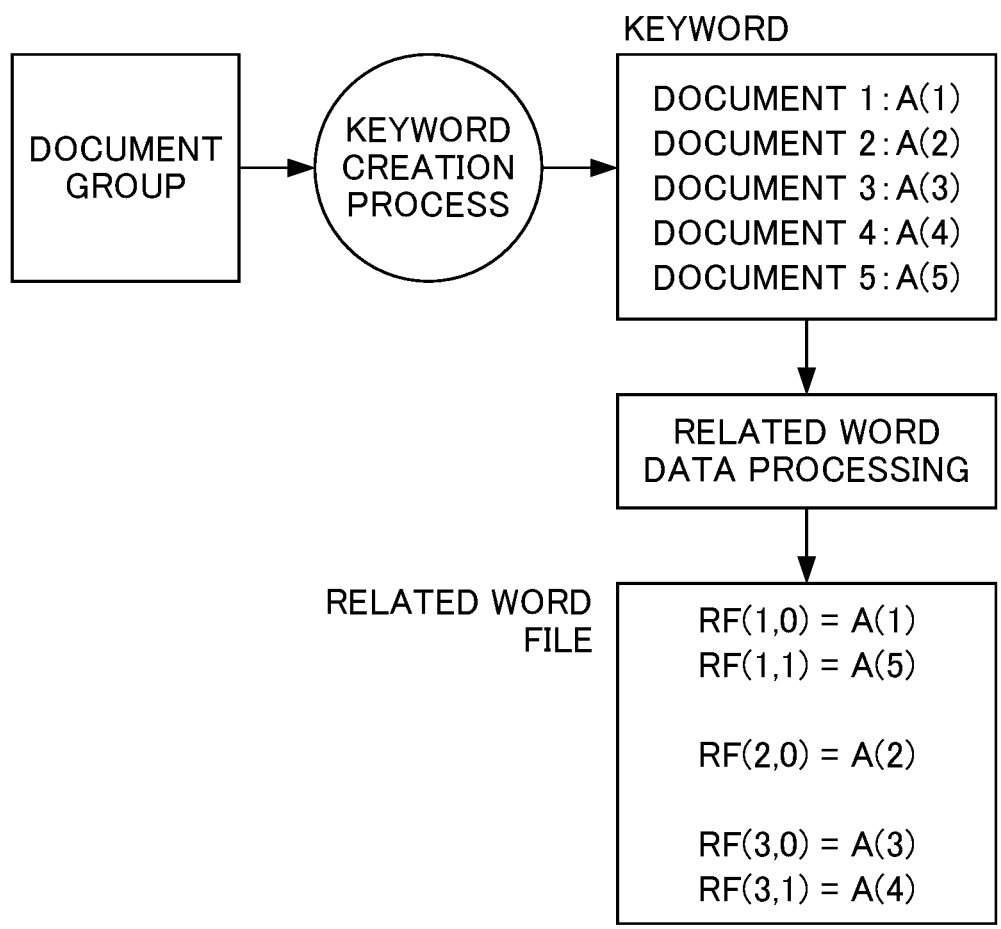
FIG. 3 is a schematic diagram illustrating a related word database creation procedure according to the first embodiment.

FIG. 3 is a schematic diagram illustrating a procedure of creating the related word file 22 according to the first embodiment. The retrieving device 1 performs a keyword creation process with respect to the document database 21 and one or a plurality of search keywords are set for each piece of document data.

Subsequently, by related word data processing, keywords are grouped and the related word file 22 is created. For example, the related word file 22 including an arrangement RF correlated with a plurality of keywords like $RF(1)=\{A(1), A(5)\}$, $RF(2)=\{A(2)\}$, and $RF(3)=\{A(3), A(4)\}$ is created for keywords $A(1)$, $A(2)$, $A(3)$, $A(4)$, and $A(5)$ for each piece of document data.

Figure 4:
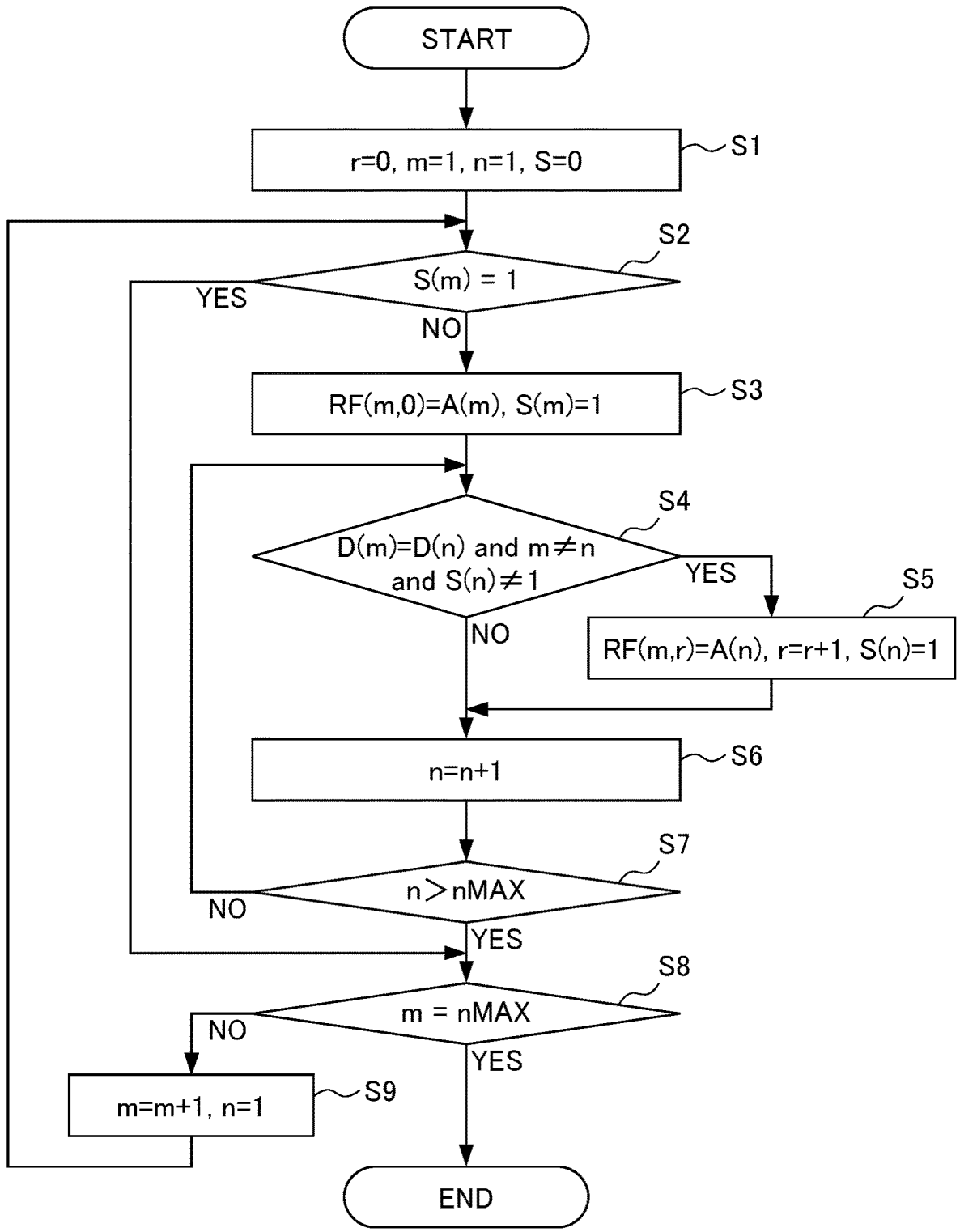
FIG. 4 is a flowchart illustrating related word data processing according to the first embodiment.

FIG. 4 is a flowchart illustrating related word data processing according to the first embodiment. In this example, perfect matching is employed as the degree of matching of parts to be classified into the same group.

In step S1, the control unit 10 (the classifying unit 11) initializes variables r, m, and n (r=0, m=1, and n=1). Moreover, the control unit 10 initializes a aggregation flag $S(i)$ (i≤i≤nMax) of each piece of document data (management numbers 1 to nMax) to 0.

In step S2, the control unit 10 (the classifying unit 11) determines whether aggregation of m-th document data is completed ($S(m)=1$). The process proceeds to step S8 when the determination result is YES and the process proceeds to step S3 when the determination result is NO.

In step S3, the control unit 10 (the extracting unit 12) extracts the keyword $A(m)$ of the m-th document data and stores the extracted keyword $A(m)$ in the related word file 22 ($RF(m,0)=A(m)$). Moreover, the control unit 10 (the extracting unit 12) updates the aggregation flag of the m-th document data to a aggregation completion state ($S(m)=1$)

In step S4, the control unit 10 (the classifying unit 11) compares the m-th and n-th pieces of document data and determines whether the parts are the same ($D(m)=D(n)$ and m≠n and $S(n)$≠1). The process proceeds to step S5 when the determination result is YES and the process proceeds to step S6 when the determination result is NO.

In step S5, the control unit 10 (the extracting unit 12) extracts the keyword $A(n)$ of the n-th document data as the r-th related word of the m-th document data and stores the keyword $A(n)$ in the related word file 22 ($RF(m,r)=A(n)$). Moreover, the control unit 10 (the extracting unit 12) counts up the variable r and updates the n-th aggregation flag to a aggregation completion state ($S(n)=1$).

In step S6, the control unit 10 (the classifying unit 11) counts up the variable n ($n=n+1$). In step S7, the control unit 10 (the classifying unit 11) determines whether the variable n exceeds the maximum value nMax. The process proceeds to step S8 when the determination result is YES, and the process proceeds to step S4 when the determination result is NO.

In step S8, the control unit 10 (the classifying unit 11) determines whether nMax is equal to the variable m. The process ends when the determination result is YES, and the process proceeds to step S9 when the determination result is NO.

In step S9, the control unit 10 (the classifying unit 11) counts up the variable m ($m=m+1$) and initializes the variable n ($n=1$). After that, the process proceeds to step S2.

As described above, by the related word data processing, the keywords of document data are grouped as related words and are aggregated in the related word file 22. Furthermore, from this aggregate result, the extracting unit 12 may perform a determination process such as grouping a predetermined number of keywords having a higher frequency aggregated into the same group as related words and may acquire highly reliable information only. Moreover, even when a plurality of keywords are extracted from document data, a determination process may be performed on the basis of related frequencies of keywords independently.

Figures 5, 6:
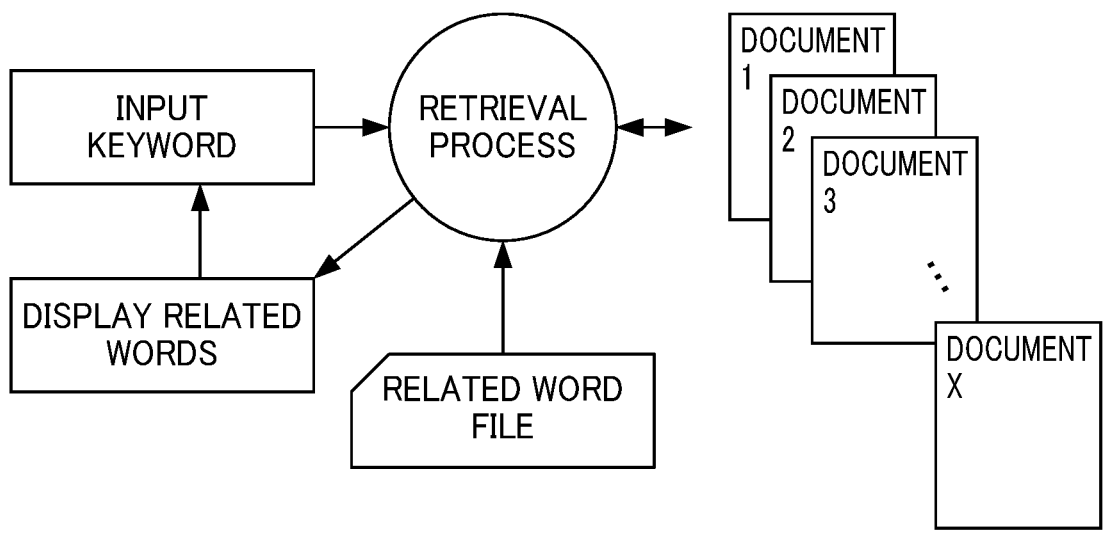
FIG. 5 is a schematic diagram illustrating a keyword-based retrieval procedure according to the first embodiment.
FIG. 6 is a diagram illustrating a screen display example of related words according to the first embodiment.

FIG. 5 is a schematic diagram illustrating a keyword-based retrieval procedure according to the first embodiment. Upon receiving a keyword input by a user, the retrieving device 1 retrieves document data stored in the document database 21. In this case, the retrieving device 1 reads the related word file 22 and displays related words aggregated in the same group as the input keyword on a screen as a guidance to prompt the user to perform additional retrieval using the related words.

FIG. 6 is a diagram illustrating a screen display example of related words according to the first embodiment. The retrieving device 1 displays related words (for example, "noise" and "abnormal sound" for the input keyword (for example, "vibration"). In this case, the displayed related words may be arranged in descending order of degrees of correspondence corresponding to the frequencies aggregated in the same group, for example. The retrieving device 1 receives the related word selected from the displayed related words and performs a retrieval process using the selected related word as a new keyword.

According to the first embodiment, the retrieving device 1 classifies document data on the basis of the degree of matching the first item (part) among a plurality of items that form the document data and extracts a group of keywords included in the second item (phenomenon) from the document data in the same group as related words to create the related word file 22. In this way, the retrieving device 1 can provide related words for retrieving a wide range of documents described using different words to the user and can improve the retrieval efficiency.

The retrieving device 1 can provide a wide range of case documents related to the keyword by performing retrieval using related words stored in the related word file 22 as well as the keyword received first from the user. For example, when repair parts of a plurality of apparatuses have the same specification and have the same number of pieces to each other, these apparatuses are likely to have the same failure phenomenon. Since the retrieving device 1 treats keywords for expressing this same phenomenon as synonymous related words and performs retrieval using the related words as search keywords, it is possible to improve document retrieval efficiency.

The retrieving device 1 can improve retrieval accuracy by employing perfect matching as the degree of matching of the first items to be classified into the same group and can extract a wide range of related words by employing partial matching.

The retrieving device 1 displays related words of the input first keyword and receives the second keyword selected from the related words. Therefore, since the retrieving device 1 can provide related keywords to the user as a guidance, it is possible to alleviate the burden of the user thinking of search keywords and inputting the same and to improve retrieval efficiency. Moreover, the retrieving device 1 can simplify the user's operation and retrieve a wide range of documents by executing retrieval automatically using related words sequentially.

Second Embodiment

The document data stored in the document database 21 according to the first embodiment is document data made up of phenomena, causes, countermeasures, and parts stored as past cases for one or a plurality of apparatuses having the same specifications, for example. In this manner, the retrieving device 1 according to the first embodiment enables the document data to be retrieved on the basis of related words in the document data of one or a plurality of apparatuses having the same specifications, for example. Therefore, the user can obtain information on causes, countermeasures, and parts by retrieving similar phenomena occurred in the past in one or a plurality of apparatuses having the same specifications by using the retrieving device 1 according to the first embodiment. On the other hand, in a manufacturing site, there are many cases in which apparatuses related to mechanics (hereinafter also referred to as "mechanical apparatuses") of different manufacturers and common apparatuses related to control (hereinafter also referred to as "control apparatuses") of the same manufacturer are combined and used as one machine tool. In such a case, it is difficult to easily manage and retrieve the failure reports of the mechanical apparatuses and the failure reports of the control apparatuses as one set of related failure reports comprehensively.

A retrieving device 1 according to the second embodiment manages document data stored in two or more different document databases 21 as one set of pieces of related document data and manages a group of keywords extracted as related words for retrieval from the document data stored in the respective document databases 21 as one set of keyword groups comprehensively. In this way, the retrieving device 1 enables two or more pieces of document data to be retrieved simultaneously as one set of groups of document data group. For example, as described above, when mechanical apparatuses of different manufacturers and a common control apparatus of the same manufacturer are combined and used as one machine tool, it is easy to manage and retrieve the failure reports of the mechanical apparatuses and the failure reports of the control apparatuses as one set of failure reports comprehensively. Hereinafter, the retrieving device 1 according to the second embodiment of the present invention will be described. The same components as those of the retrieving device 1 according to the first embodiment will be denoted by the same reference numerals and the description thereof will be omitted.

Figure 7:
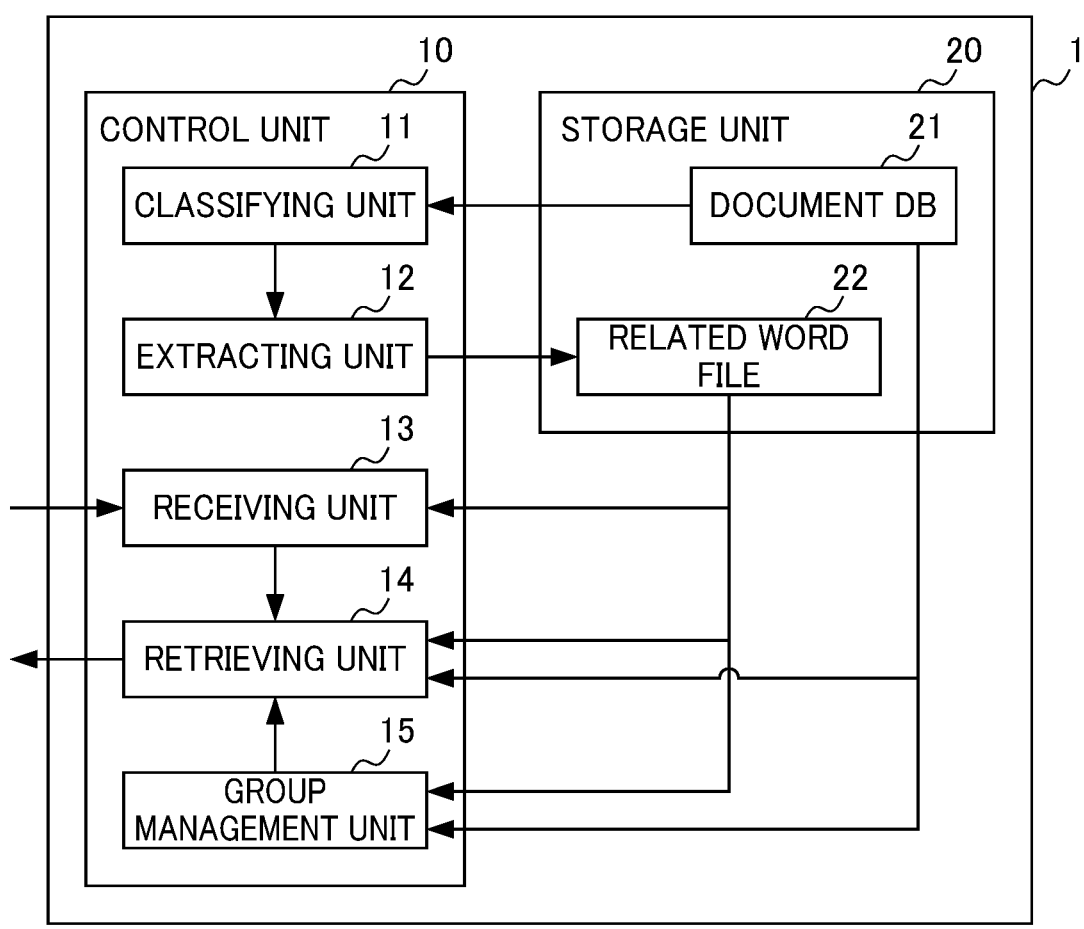
FIG. 7 is a block diagram illustrating a functional configuration of a retrieving device according to a second embodiment.

FIG. 7 is a block diagram illustrating a functional configuration of the retrieving device 1 according to the second embodiment. Similarly to the first embodiment, the retrieving device 1 is an information processing device (a computer) such as a server device or a PC and includes a control unit 10 and a storage unit 20. Furthermore, the retrieving device 1 includes various data input/output devices, a communication device, and the like, and retrieves document data stored in respective document database 21 included in one set of database groups on the basis of a search keyword input from a user and outputs a retrieval result.

The storage unit 20 stores two or more document databases (DBs) 21 in which retrieval target document data is stored and two or more related word files 22 in which a group of keywords classified as synonyms are described in correlation as well as a retrieving program for causing the control unit 10 to execute respective functions of the second embodiment. These pieces of data may be stored outside the retrieving device 1 and may be read and written by communication with the retrieving device 1.

The control unit 10 includes a classifying unit 11, an extracting unit 12, a receiving unit 13, a retrieving unit 14, and a group management unit 15, and retrieves document data stored in the document databases 21 included in one set of database groups using related words of a keyword input by the user with the aid of these functional units.

The classifying unit 11 and the extracting unit 12 perform the same processing as the first embodiment with respect to a processing target document database 21 indicated by the instruction from the user, for example. By doing so, the related word file 22 is created for the respective document databases 21.

For example, "Consumption of centralized lubricating oil is fast" and "Doorlock cannot be unlocked" are included as phenomenon data of the document data (a failure report) related to a mechanical apparatus, {(Centralized lubricating oil)=(Lubricant oil)}, {(Doorlock cannot be unlocked)= (Door won't open)}, and the like are described in the related word file 22 of the mechanical apparatus by the classifying unit 11 and the extracting unit 12. Moreover, when "Fan alarm of control apparatus is output" and "Screen display darkens" are included as phenomenon data of document data (a failure report) related to a control apparatus, {(Fan)=(Fan motor)=(Fan motor unit)}, {(Screen is dark)=(Screen is invisible)=(Power is off)}, and the like are described in the related word file 22 of the control apparatus by the classifying unit 11 and the extracting unit 12.

The group management unit 15 manages at least two or more different document databases 21 as one set of database groups on the basis of an instruction from the user, for example. At the same time, the group management unit 15 manages a group of keywords extracted as search related words for retrieval by the classifying unit 11 and the extracting unit 12 as one set of keyword groups for the respective document databases 21 included in one set of database groups. The group management unit 15 may create a management table of the document databases 21 managed as one set of database groups so that the management table is treated as one virtual file in order to manage at least two or more different document databases 21 as one set of database groups. For example, the management table may be configured so as to associate (link) identification information of one set of database groups with identification information of two or more document databases 21 included in the one set of database groups. Moreover, the document databases 21 managed as one set of database groups may be stored as one physical file.

The receiving unit 13 receives a document data retrieval request based on a first keyword. More specifically, the receiving unit 13 receives identification information of one set of database groups corresponding to one set of machine tools, for example, and the first keyword input by the user via an input unit of the retrieving device 1. The receiving unit 13 may receive these pieces of input data from a client terminal via a network, for example. Furthermore, the receiving unit 13 extracts a group of keywords including the first keyword from all related word files 22 included in the one set of database groups and displaying the group of keywords to thereby receive a second keyword selected among the group of keywords. By doing so, the user does not need to know which document database 21 the document data related to the first keyword is stored.

The retrieving unit 14 retrieves document data stored in all document databases 21 included in the one set of database groups using the first keyword and retrieves document data stored in all document databases 21 or the document database 21 corresponding to a group of keywords including the first keyword using the second keyword included in the group of keywords. Similarly to the first embodiment, the retrieving unit 14 may perform retrieval using the second keyword after waiting for the second keyword received by the receiving unit 13. Alternatively, the retrieving unit 14 may sequentially extract the second keywords from the group of keywords including the first keyword and may retrieve document data automatically from the respective extracted second keywords.

Figure 8:
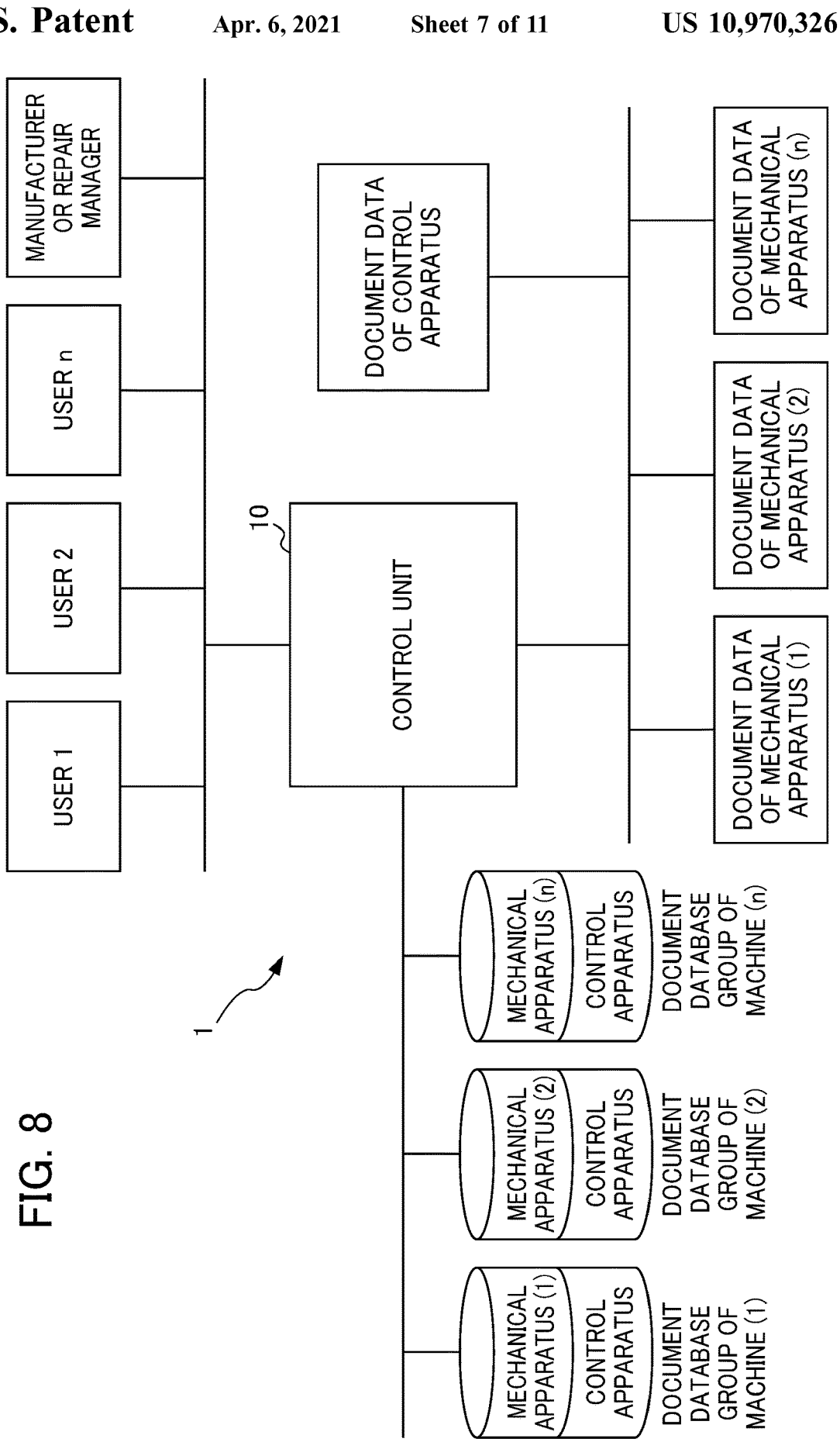
FIG. 8 is a schematic diagram when the retrieving device according to the second embodiment is implemented as a distributed system on a network.

FIG. 8 is a schematic diagram when the retrieving device 1 according to the second embodiment is implemented as a distributed system on a network and is applied to a mechanical apparatus and a control apparatus. It is assumed that, when the retrieving device 1 is used via a network, known authentication of an accessing user and access control of the user (assignment of access right permitted to the user) are performed. As illustrated in FIG. 8, a manufacturer, a maintenance manager, or the like of a mechanical apparatus (i) (1≤i≤n) and/or a control apparatus can generate a related word file corresponding to document data of each apparatus from the document data of each apparatus (that is, a failure report made up of pieces of data for phenomena, causes, countermeasures, and parts stored as past cases of the apparatus) via the network. In this example, the control apparatus is common to a plurality of mechanical apparatuses (i).

Moreover, a manufacturer, a maintenance manager, or the like of mechanical apparatuses (i) and/or a control apparatus can manage the document data (a failure report) of the mechanical apparatuses (i), the document data (a failure report) of the control apparatus, the related word file 22 related to the document data of the mechanical apparatuses (i), and the related word file 22 related to the document data of the control apparatus in correlation with one set of related database groups (i) by designating the identification information of the control apparatus and the mechanical apparatuses (i) configured as one set of machine tools (i) via a network. By doing so, a user or a manufacturer, a maintenance manager, and the like of the mechanical apparatuses (i) or the control apparatus can efficiently retrieve the document data (the failure reports) of the control apparatus and the mechanical apparatuses (i) configured as one set of machine tools (i) via the network.

FIGS. 9A to 9C are diagrams illustrating a display example of a retrieval screen of the retrieving device 1 according to the second embodiment. Using an input screen illustrated in FIG. 9A, the receiving unit 13 receives the identification information (apparatus ID) of one set of retrieval target machine tools. By doing so, the receiving unit 13 specifies a document database 21 in which the document data (failure reports) of the control apparatus and the mechanical apparatuses that form the machine tools are stored. Subsequently, using an input screen illustrated in FIG. 9B, the receiving unit 13 receives an inquiry content (a document data retrieval request based on a first keyword). By doing so, the receiving unit 13 can extract the related words of the first keyword on the basis of the related word file 22 related to the control apparatus and the related word file 22 related to the mechanical apparatuses and display the extracted related words. In this case, it is preferable that the receiving unit 13 displays whether the extracted related word is a related word extracted from the related word file 22 related to the control apparatus, a related word extracted from the related word file 22 related to the mechanical apparatus, or a related word common to both. By doing so, the user can easily understand the relation between the first keyword and the control apparatus and the mechanical apparatus.

After that, the retrieving unit 14 retrieves the document data (a failure report) related to the control apparatus and/or the document data (a failure report) related to the mechanical apparatus on the basis of a related word selected by the user or a predetermined related word having a high priority. The retrieving unit 14 extracts the document data (the failure report) related to the control apparatus and/or the document data (the failure report) related to the mechanical apparatus as a retrieval result. As a result, as illustrated in FIG. 9C, the retrieving unit 14 can display the retrieval result (for example, candidates for causes and countermeasures).

According to the second embodiment, when mechanical apparatuses of different manufacturers and a common control apparatus of the same manufacturer are combined and used as one machine tool, the retrieving device 1 can manage the document data (the failure reports) of the mechanical apparatuses and the control apparatuses as one set of database groups comprehensively.

Moreover, the retrieving device 1 is implemented as a distributed system on a network so that the document data (the failure reports) of the mechanical apparatuses and the control apparatuses related to a plurality of machine tools can be referred to from a plurality of users. In this way, it is not necessary to construct a plurality of systems but it is possible to construct a system at a low cost. Moreover, the retrieving device 1 generates and stores the document data of the control apparatus and the document data of the mechanical apparatus separately and manages the document database 21 in which the document data of the control apparatus is stored and the document database 21 in which the document data of the mechanical apparatus is stored as one set of database groups so as to be able to cope with a plurality of machines. In this way, in a machine group in which the control apparatuses are the same and the mechanical apparatuses are different, for example, it is possible to share information on the control apparatus and to eliminate a related word file creation time.

In the second embodiment, a case in which mechanical apparatuses of different manufacturers and a common control apparatus of the same manufacturer are combined and used as one machine tool has been described. However, the present invention is not limited to this. The second embodiment can be applied to a case in which an arbitrary mechanical apparatus and an arbitrary control apparatus are combined and used as one machine tool.

Moreover, in the second embodiment, although the document data (failure reports) of the mechanical apparatus and the control apparatus has been described as an example, the document data is not limited to machine information. The retrieving device 1 can manage two or more different document databases 21 in which document data having a first item in which a combination of at least one or more symbol strings are described and a second item including a keyword is stored as one set of database groups.

Third Embodiment

Hereinafter, a third embodiment of the present invention will be described. In the third embodiment, a configuration of the receiving unit 13 of the retrieving device 1 is different from that of the first and second embodiments.

In the first and second embodiments, the data that the receiving unit 13 receives as a retrieval request is the first keyword. In this case, the users think of a keyword to narrow down desired document data using a logical operation such as AND or OR by themselves. However, some users may want to input a conversational sentence or the like that describes the state of an apparatus as it is. Therefore, the retrieving device 1 of the third embodiment receives one or a plurality of sentences as a retrieval request.

After receiving one or a plurality of sentences as a retrieval request, the receiving unit 13 extracts a first keyword by the same procedure as a procedure of the extracting unit 12 extracting a group of keywords from the one or the plurality of sentences. The procedure of extracting a group of keywords generally uses morpheme analysis. In this case, database of unnecessary words excluded from extraction targets, synonyms (thesaurus) classified as having the same meaning, and the like is referred to and the group of keywords are determined. This database is referred to in common by the extracting unit 12 and the receiving unit 13, whereby the retrieving device 1 matches the group of keywords in the related word file 22 and the first keyword as the retrieval request. As a result, the retrieval accuracy is improved.

Fourth Embodiment

Hereinafter, a fourth embodiment of the present invention will be described. The same components as those of the first to third embodiments will be denoted by the same reference numerals, and the description thereof will be omitted.

In the first and second embodiments, the data received as a retrieval request is the first keyword. In the third embodiment, the first keyword is extracted from the one or the plurality of received sentences. In these cases, when retrieving knowledge information on failures of machines, for example, a user has to analyze a failure state to create a description or keywords. Therefore, the retrieving device 1 of the fourth embodiment automatically create the first keyword according to a conversion condition based on an empirical rule using sensor information obtained from machines as an input.

FIG. 10 is a block diagram illustrating a functional configuration of a retrieving device 1 according to the fourth embodiment. A control unit 10 of the retrieving device 1 includes a classifying unit 11, an extracting unit 12, a receiving unit 13, a retrieving unit 14, a group management unit 15, a sensor input unit 16, and a state acquisition unit 17. Moreover, the storage unit 20 includes a document database 21, a related word file 22, and a conversion database (DB) 23.

The sensor input unit 16 receives sensor information including measurement data as an input from various sensors provided in a monitoring target apparatus (for example, the mechanical apparatus, the control apparatus or the like). The state acquisition unit 17 converts the received sensor information to a state keyword indicating an apparatus state on the basis of a predetermined conversion condition stored in the conversion database 23. The state keyword is input to the receiving unit 13 as a first keyword for document retrieval.

Here, the conversion condition stored in the conversion database 23 is a condition for comparing a sensor value or an operation result (for example, an integral value) of the sensor value with a threshold to convert the same to a state keyword and is set in advance from an empirical rule based on past cases. Moreover, the state acquisition unit 17 may calculate a feature amount from the sensor information using FFT, principal component analysis, or the like, for example, and determine the state keyword according to a conversion condition based on the feature amount.

FIG. 11 is a diagram illustrating the conversion database 23 according to the fourth embodiment. In this example, a condition for converting temperature and pressure acquired as sensor information to a state keyword is set. For example, when the number of times the temperature exceeds a threshold within a predetermined measurement period is 5 or more and an actual integral value of temperature is equal to or larger than a predetermined value, the state acquisition unit 17 acquires a state keyword "Overheat". Similarly, when the number of times the temperature exceeds a threshold within a predetermined measurement period is 5 or more and an actual integral value of temperature is smaller than a predetermined value, the state acquisition unit 17 acquires a state keyword "Load abnormality". Moreover, when present pressure exceeds a threshold and an actual integral value of the pressure within a predetermined measurement period is equal to or larger than a predetermined value, the state acquisition unit 17 acquires a state keyword "Pressure abnormality".

FIG. 12 is a diagram illustrating a display example of a retrieval result obtained by the retrieving device 1 according to the fourth embodiment. The retrieving unit 14 acquires related words from the related word file 22 using the state keyword converted by the state acquisition unit 17 as the first keyword and then searches the document database 21.

When document data is retrieved on the basis of a state keyword (for example, "Overheat") converted from the sensor information and the related words thereof, information on phenomena, causes, countermeasures, and parts is displayed as a retrieval result. In this example, a message that a control device that monitors sensor data has detected a state "Overheat" and a countermeasure case which is a retrieval result are displayed on a screen. Moreover, for example, when another document related to a part replacement method is retrieved for "Replacement" described in the countermeasure case, an underlined link "Replacement method" may be displayed. Moreover, when this link is selected, the screen may display another document.

Figure 13:
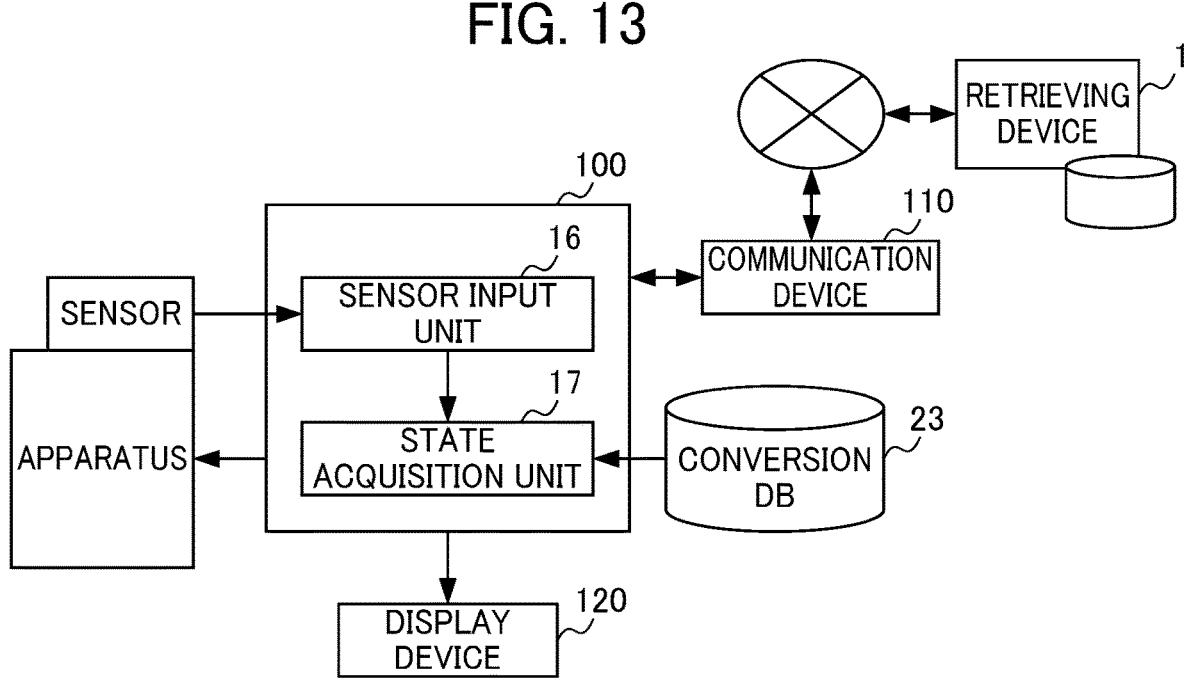
FIG. 13 is a schematic diagram when the retrieving device according to the fourth embodiment is implemented as a distributed system on a network.

FIG. 13 is a schematic diagram when the retrieving device 1 according to the fourth embodiment is implemented as a distributed system on a network. In this case, the sensor input unit 16, the state acquisition unit 17, and the conversion database 23 may be provided outside the retrieving device 1.

For example, a control device 100 that controls a monitoring target apparatus includes the sensor input unit 16 and the state acquisition unit 17. The control device 100 transmits a state keyword converted on the basis of the conversion database 23 to the retrieving device 1 (the receiving unit 13) via a communication device 110 as a first keyword for the retrieval request. Upon receiving the retrieval result via the communication device 110, the control device 100 displays the retrieval result on a display device 120 as a response to an inquiry to notify the user.

According to the fourth embodiment, since the keyword is automatically generated from the sensor information, the user's burden is reduced as compared to when the user determines an apparatus state and creates a search keyword. Furthermore, since a plurality of pieces of sensor information is used, the amount of information used for understanding the apparatus state increases and a keyword that expresses the state more accurately is generated. As a result, the retrieving device 1 can provide a useful retrieval result in a timely manner.

While embodiments of the present invention have been described above, the present invention is not limited to the above-described embodiments. Moreover, the advantageous effects described in the embodiments of the present invention are only exemplary ones of most preferable effects produced by the present invention, and the advantageous effects of the present invention are therefore not limited to those described in the embodiments of the present invention.

The retrieving method by the retrieving device 1 is realized by software. When the retrieving method is realized by software, programs that form the software are installed in a computer (the retrieving device 1). Moreover, these programs may be recorded on a removable medium and distributed to users and may be distributed by being downloaded to a computer of a user via a network.

EXPLANATION OF REFERENCE NUMERALS

1 Retrieving device
10 Control unit
11 Classifying unit
12 Extracting unit
13 Receiving unit
14 Retrieving unit
15 Group management unit
16 Sensor input unit
17 State acquisition unit
20 Storage unit
21 Document database
22 Related word file
23 Conversion database

What is claimed is:

1. A retrieving device comprising:
at least one memory configured to store a program; and
at least one processor configured to execute the program and control the retrieving device to:
classify document data pieces, each made up of a plurality of items, based on a determination of matching of a first item among the plurality of items, the first item having a combination of one or more symbol strings and being described in a database in which the document data is stored, the matching being determined between a plurality of first items in the document data pieces to classify certain first items into a classification group of document data pieces;
extract a group of keywords as related words included in a second item among the plurality of items from pieces of second item document data in a same classification group of document data pieces as the certain first items;
receive a retrieval request based on a first keyword; and
retrieve document data using the first keyword and retrieve document data using a second keyword included in a same classification group of keywords as the first keyword so that the first keyword and the second keyword are related words,
wherein the document data is a failure report of an apparatus, and
wherein the first item is a repair part, and the second item is a failure phenomenon.

2. The retrieving device according to claim 1, wherein the at least one processor is further configured to execute the program and control the retrieving device to determine a match between the certain first items into the classification group if the combination of one or more symbol strings of each of the certain first items are identical to each other.

3. The retrieving device according to claim 2, wherein the at least one processor is further configured to execute the program and control the retrieving device to determine a match between the certain first items into the classification group if at least portions of the combination of one or more symbol strings of each of the certain first items are identical.

4. The retrieving device according to claim 1, wherein the at least one processor is further configured to execute the program and control the retrieving device to display a group of keywords including the first keyword and receives input of the second keyword.

5. The retrieving device according to claim 1, wherein the at least one processor is further configured to execute the program and control the retrieving device to sequentially extract the second keywords from a group of keywords including the first keyword and retrieve the document data using the respective second keywords.

6. The retrieving device according to claim 1,
wherein the at least one processor is further configured to execute the program and control the retrieving device to:
manage at least two or more different databases as one set of database groups and manages a group of keywords extracted as one set of keyword groups for each of the databases included in the one set of database groups, wherein
document data stored in the database included in the one set of database groups is retrieved with respect to the retrieval request based on the first keyword and the document data is retrieved using the second keyword included in the same group of keywords as the first keyword in the one set of keyword groups.

7. The retrieving device according to claim 1, wherein one or a plurality of sentences is received as the retrieval request and then the first keyword is extracted from the one or the plurality of sentences by the same procedure as a procedure of extracting the group of keywords.

8. The retrieving device according to claim 1,
wherein the at least one processor is further configured to execute the program and control the retrieving device to:
input sensor information of an apparatus; and
convert the sensor information to a state keyword indicating the apparatus state on the basis of a predetermined conversion condition, wherein
receive the state keyword as the first keyword.

9. The retrieving device according to claim 1, wherein the document data is a failure report of an apparatus, and the combination of one or more symbol strings include a specification number and the number of repair target parts.

10. A retrieving method for causing a computer to execute:
classifying document data pieces, each made up of a plurality of items, based on a determination of matching of a first item among the plurality of items, the first item having a combination of one or more symbol strings and being described in a database in which the document data is stored, the matching being determined between a plurality of first items in the document data pieces to classify certain first items into a classification group of document data pieces;
extracting a group of keywords as related words included in a second item among the plurality of items from pieces of second item document data in a same classification group of document data pieces as the certain first items;
receiving a retrieval request based on a first keyword; and
retrieving document data using the first keyword and retrieving document data using a second keyword included in a same classification group of keywords as the first keyword so that the first keyword and the second keyword are related words,
wherein the document data is a failure report of an apparatus, and
wherein the first item is a repair part, and the second item is a failure phenomenon.

11. The retrieving method according to claim 10, further causing the computer to execute:
managing at least two or more different databases as one set of database groups and managing a group of keywords extracted in the extracting as one set of keyword groups for each of the databases included in the one set of database groups, wherein
the retrieving involves retrieving document data stored in the database included in the one set of database groups with respect to the retrieval request based on the first keyword and retrieving the document data using the second keyword included in the same group of keywords as the first keyword in the one set of keyword groups.

12. The retrieving method according to claim 11, wherein the receiving involves receiving one or a plurality of sentences as the retrieval request and then extracts the first keyword from the one or the plurality of sentences by the same procedure as a procedure of extracting the group of keywords in the extracting.

13. The retrieving method according to claim 10, further causing the computer to execute:
inputting sensor information of an apparatus; and
converting the sensor information to a state keyword indicating the apparatus state on the basis of a predetermined conversion condition, wherein
the receiving involves receiving the state keyword as the first keyword.

14. A non-transitory computer-readable recording medium storing a retrieving program causing a computer of a retrieving device to execute:
classifying document data pieces, each made up of a plurality of items, based on a determination of matching of a first item among the plurality of items, the first item having a combination of one or more symbol strings and being described in a database in which the document data is stored, the matching being determined between a plurality of first items in the document data pieces to classify certain first items into a classification group of document data pieces;
extracting a group of keywords as related words included in a second item among the plurality of items from pieces of second item document data in a same classification group of document data pieces as the certain first items;
receiving a retrieval request based on a first keyword; and
retrieving document data using the first keyword and retrieving document data using a second keyword included in a same classification group of keywords as the first keyword so that the first keyword and the second keyword are related words,
wherein the document data is a failure report of an apparatus, and
wherein the first item is a repair part, and the second item is a failure phenomenon.

* * * * *